United States Patent
Jeung et al.

(10) Patent No.: US 7,787,991 B2
(45) Date of Patent: Aug. 31, 2010

(54) ROBOT CLEANER SYSTEM AND CONTROL METHOD THEREOF

(75) Inventors: Sam-jong Jeung, Gwangju (KR); Jeong-gon Song, Gwangju (KR); Myeong-ho Kim, Gwangju (KR); Ju-sang Lee, Gwangju (KR); Jang-youn Ko, Gwangju (KR); Kyoung-woung Kim, Gwangju (KR); Hak-bong Lee, Jeollanam-do (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 520 days.

(21) Appl. No.: 11/805,039

(22) Filed: May 22, 2007

(65) Prior Publication Data

US 2008/0140254 A1    Jun. 12, 2008

(30) Foreign Application Priority Data

Dec. 6, 2006    (KR) ...................... 10-2006-0122882

(51) Int. Cl.
*G06F 19/00* (2006.01)
(52) U.S. Cl. .................. 700/245; 700/255; 700/258; 901/1; 318/587; 15/49.1; 15/319
(58) Field of Classification Search .............. 700/245, 700/255, 258; 901/2, 1; 318/587; 180/167; 15/49.1, 319
See application file for complete search history.

(56) References Cited

U.S. PATENT DOCUMENTS 5,440,216 A * 8/1995 Kim ........................... 318/587
5,995,884 A * 11/1999 Allen et al. .................... 701/24
6,594,844 B2 * 7/2003 Jones .......................... 15/49.1
(Continued)

FOREIGN PATENT DOCUMENTS

JP    8271227    10/1996
(Continued)

OTHER PUBLICATIONS

Silvermann et al., Robust navigation and battery re-charging system for long term activity of autonomous mobile robot, May 2002, 2002 IEEE International Conference on Robotics and Automation, Washington DC, pp. 1050-1055.*

Office Action received from the Russian Patent Office on Oct. 15, 2008, corresponding to Russian Patent Application No. 2007122160.

*Primary Examiner*—Khoi Tran
*Assistant Examiner*—Jaime Figueroa
(74) *Attorney, Agent, or Firm*—Ohlandt, Greeley, Ruggiero & Perle, L.L.P.

(57) ABSTRACT

A robot cleaner system is disclosed. The robot cleaner system includes a robot cleaner to carry out a cleaning operation while automatically traveling around along a surface to be cleaned, and a charging station connectable with the robot cleaner to charge a charging battery mounted in the robot cleaner with electricity. The charging station includes a setting switch to selectively set up a value of threshold height. The robot cleaner includes a control unit to receive the value of threshold height set up at the charging station from the charging station, to store the received value of threshold height in a memory, to compare a value of threshold height detected by a height sensor of the robot cleaner in traveling of the robot cleaner with the value of threshold height stored in the memory, to control the robot cleaner to travel while crossing over a threshold when the detected value of threshold height is the same as and less than the stored value of threshold height and to control the robot cleaner to travel after backing up and rotating when the detected value of threshold height exceeds the stored value of threshold height.

8 Claims, 4 Drawing Sheets

U.S. PATENT DOCUMENTS

| | | | |
|---|---|---|---|
| 6,764,373 B1* | 7/2004 | Osawa et al. | 446/175 |
| 7,031,805 B2* | 4/2006 | Lee et al. | 700/245 |
| 7,167,775 B2* | 1/2007 | Abramson et al. | 700/245 |
| 7,213,663 B2* | 5/2007 | Kim | 180/6.5 |
| 7,438,766 B2* | 10/2008 | Song et al. | 134/18 |
| 2004/0111184 A1* | 6/2004 | Chiappetta et al. | 700/245 |
| 2004/0158354 A1* | 8/2004 | Lee et al. | 700/245 |
| 2004/0193339 A1* | 9/2004 | Hulden | 701/23 |
| 2005/0251292 A1* | 11/2005 | Casey et al. | 700/245 |
| 2006/0085095 A1* | 4/2006 | Reindle et al. | 700/258 |
| 2006/0200282 A1* | 9/2006 | Lee et al. | 701/23 |

FOREIGN PATENT DOCUMENTS

| | | |
|---|---|---|
| JP | 2003047579 | 2/2003 |
| JP | 2006-087507 | 4/2006 |
| JP | 2006146376 | 6/2006 |
| KR | 100635828 | 10/2006 |

* cited by examiner

ROBOT CLEANER SYSTEM AND CONTROL METHOD THEREOF

CROSS-REFERENCE TO RELATED APPLICATIONS

This application claims the benefit under 35 U.S.C. §119 (a) of Korean Patent Application No. 10-2006-122882, filed Dec. 6, 2006, in the Korean Intellectual Property Office, the entire disclosure of which is incorporated herein by reference.

BACKGROUND OF THE INVENTION

1. Field of the Invention

The present disclosure relates generally to a robot cleaner system. More particularly, the present disclosure relates to a robot cleaner system in which a robot cleaner can clean a surface to be cleaned while traveling by itself, and a control method thereof.

2. Description of the Related Art

Generally, a robot cleaner takes in a foreign substance, such as dust, dirt, or the like, from a surface to be cleaned while traveling around by itself without a user's manipulation within a cleaning area, and thus automatically cleans the cleaning area.

Such a robot cleaner has a distance sensor or a photographing unit, so that it cleans the cleaning area while confirming whether there is an obstacle located in front thereof or confirming a distance therefrom to a device or a stationery, a wall and the like installed in the cleaning area and thus moving to avoid a collision or obstruction thereto.

The robot cleaner as described above is provided with a left driving wheel, a right driving wheel, and a driven wheel, which are installed on a bottom of a cleaner body. The wheels are connected to and driven by driving motors, respectively. The driving motors are driven under the control of a control unit, so that the cleaner body can change a traveling direction thereof.

In addition, in the bottom of the cleaner body is a suction port. The suction port takes in the foreign substance, such as the dust, the dirt, or the like, from the surface to be cleaned. A suction force, which is applied to the suction port, is provided by a suction motor installed in the cleaner body. The suction port is connected to a separate dust collecting chamber formed in the cleaner body. Accordingly, the foreign substance contained in taken-in air is collected into and then removed from the dust collecting chamber. The robot cleaner as described above either cleans the cleaning area while traveling along a working path programmed beforehand or senses a traveling pattern formed on the surface to be cleaned and travels along the sensed traveling pattern. When the robot cleaner carries out the cleaning operation while traveling around by itself as described above, a control unit checks an amount of electric charge remaining in a battery and confirms whether the checked amount of electric charge is sufficient. If it is decided that the battery should be charged, the robot cleaner communicates with a charging station located at a predetermined position to search the position of the charging station, and moves to the searched position. Namely, for example, the control unit searches the position of the charging station while transmitting and receiving signals to and from the charging station, and drives the driving motors to move the cleaner body toward the charging station. Connecting terminals formed on the robot cleaner are connected to charging terminals formed on the charging station. When the connecting terminals and the charging terminals are connected with each other as described above, the control unit carries out a charging mode until the battery is fully charged with electricity. At this time, the robot cleaner stands by while stopping other modes, such as a cleaning mode, a wheel driving mode and the like.

In addition, as disclosed in Korean Patent No. 635828, the robot cleaner has a function, which sets the cleaning area by 'a portion area' or 'the entire house' and then carries out the cleaning operation according to the set area. In this case, the robot cleaner detects a height of a threshold, which forms a border between rooms, so that it crosses over the threshold or moves forward without crossing over the threshold.

However, the robot cleaner is usually delivered from a warehouse after a value for the threshold height is set up as a standard height value (20 mm). Accordingly, if because of a user's house structure, a threshold height of user's house has a value (for example, 30 mm) different from the standard height value set up in the robot cleaner, when the robot cleaner encounters a threshold in a state where the cleaning area thereof is set up as 'the entire house', it does not decide the detected threshold as a threshold, but as a precipice or the like. As a result, a problem occurs, in that it does not cross over the threshold, thereby causing the cleaning operation not to smoothly carry out according to the set area.

SUMMARY OF THE INVENTION

An aspect of the present disclosure is to address at least the above problems and/or disadvantages and to provide at least the advantages described below. Accordingly, an aspect of the present disclosure is to provide a robot cleaner system and a control method thereof, which enable a robot cleaner to smoothly cross over thresholds regardless of threshold heights which may vary due to a variety of house structures.

According to an aspect of an exemplary embodiment of the present disclosure, there is provided a control method of a robot cleaner system, including: setting up a value of threshold height, storing the set-up value of threshold height in a memory of a robot cleaner, comparing a value of threshold height detected in traveling of the robot cleaner with the stored value of threshold height, and moving the robot cleaner in a direction corresponding to the compared result.

Preferably, but not necessarily, the moving includes: traveling the robot cleaner to cross over a threshold when the detected value of threshold height is the same as or less than the stored value of threshold height; and traveling the robot cleaner after backing up and rotating the robot cleaner when the detected value of threshold height exceeds the stored value of threshold height.

The setting-up may include setting up a value of threshold height through a setting switch installed on a charging station for charging the robot cleaner with electricity. In this case, the storing may include transmitting the value of threshold height set up at the charging station to the robot cleaner when the robot cleaner is in a charging mode, comparing the transmitted value of threshold height with a value of threshold height previously stored in the memory of the robot cleaner, and substituting the previously stored value of threshold height by the transmitted value of threshold height and storing the transmitted value of threshold height when the transmitted value of threshold height and the previously stored value of threshold height do not coincide with each other.

The setting-up may include setting up a value of threshold height through a setting switch installed on the robot cleaner.

According to another aspect of an exemplary embodiment of the present disclosure, there is provided a robot cleaner system, including a robot cleaner to carry out a cleaning operation while automatically traveling around along a surface to be cleaned, and a charging station connectable with the robot cleaner to charge a charging battery mounted in the robot cleaner with electricity. The charging station includes a setting switch to selectively set a value of threshold height. A control unit of the robot cleaner receives the value of threshold height set up at the charging station from the charging station, stores the received value of threshold height in a memory, compares a value of threshold height detected by a height sensor of the robot cleaner in traveling of the robot cleaner with the value of threshold height stored in the memory, controls the robot cleaner to travel while crossing over a threshold when the detected value of threshold height is the same as and less than the stored value of threshold height and controls the robot cleaner to travel after backing up and rotating when the detected value of threshold height exceeds the stored value of threshold height.

The setting switch may use a dual inline package (DIP) switch and a rotary switch.

According to another aspect of an exemplary embodiment of the present disclosure, there is provided a robot cleaner system, including a robot cleaner to carry out a cleaning operation while automatically traveling around along a surface to be cleaned, and a charging station connectable with the robot cleaner to charge a charging battery mounted in the robot cleaner with electricity. The robot cleaner includes a setting switch to selectively set up a value of threshold height. A control unit of the robot cleaner stores the value of threshold height set up through the setting switch in a memory, compares a value of threshold height detected by a height sensor of the robot cleaner when traveling with the value of threshold height stored in the memory, controls the robot cleaner to travel while crossing over a threshold when the detected value of threshold height is the same as and less than the stored value of threshold height and controls the robot cleaner to travel after backing up and rotating when the detected value of threshold height exceeds the stored value of threshold height.

In this case, the setting switch may use a dual inline package (DIP) switch and a rotary switch.

BRIEF DESCRIPTION OF THE DRAWING FIGURES

The above aspect and other features of the present disclosure will become more apparent by describing in detail exemplary embodiments thereof with reference to the attached drawing figures, wherein.

Throughout the drawings, the same drawing reference numerals will be understood to refer to the same elements, features, and structures.

DETAILED DESCRIPTION OF THE EXEMPLARY EMBODIMENTS

Figure 1:
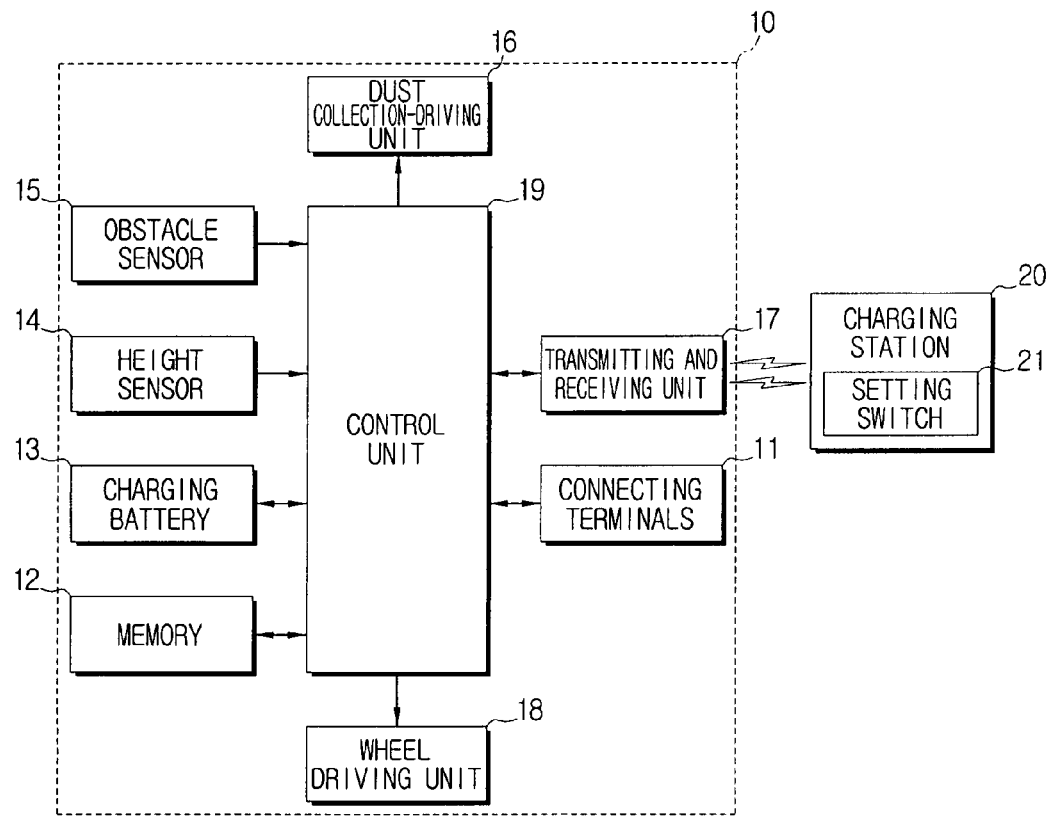
FIG. 1 is a schematic block diagram exemplifying a robot cleaner system according to a first exemplary embodiment of the present disclosure.
Figure 2:
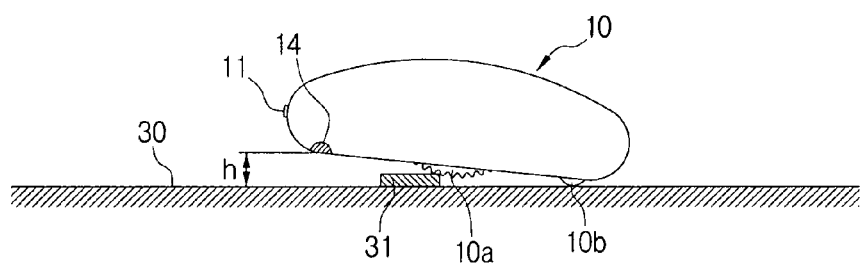
FIG. 2 is a schematic view exemplifying a robot cleaner just before it crosses over a threshold.

Hereinafter, a robot cleaner system and a control method thereof according to exemplary embodiments of the present disclosure will be described in detail with reference to the accompanying drawing figures. FIG. 1 is a schematic block diagram exemplifying a robot cleaner system according to a first exemplary embodiment of the present disclosure, and FIG. 2 is a schematic view exemplifying a robot cleaner just before it crosses over a threshold.

First, a robot cleaner 10 and a charging station 20 of the robot cleaner system according to the first exemplary embodiment of the present disclosure is explained as follows with reference to FIG. 1.

The robot cleaner 10 is provided with connecting terminals 11, which corresponds to charging terminals (not illustrated) of the charging station 20. The connecting terminals 11 are configured, so that a pair of connecting terminals is exposed to the outside. In addition, the robot cleaner 10 is provided with a memory 12, a charging battery 13, a height sensor 14, an obstacle sensor 15, a dust collection-driving unit 16, a transmitting and receiving unit 17, a wheel driving unit 18, and a control unit 19.

The memory 12 is usually made up of a read-only memory (ROM) and a random-access memory (RAM). The memory 12 stores various data, for example, a cleaning time, a cleaning area, a cleaning pattern, etc., which are required when the control unit 30 automatically controls the robot cleaner 10. Also, the memory 12 stores a value of height to thresholds of user's house, which are transmitted from the charging station 20. Since the value of height can be changed, it is preferably stored in the RAM.

The charging battery 13, which supplies an electric power for driving, is charged with a certain amount of electric charge. Accordingly, the control unit 19 detects an amount of electric charge remained in the charging battery 13 on occasion, decides whether the charging battery 13 should be charged, and then controls the robot cleaner 10 to carry out a predetermined charging mode.

As illustrated in FIG. 2, the height sensor 14 is installed on a front bottom of the robot cleaner 10 to face a surface 30 to be cleaned. The height sensor 14 measures a distance from the surface 30 to be cleaned. Also, the height sensor 14 can detect certain marks formed on the surface 30 to be cleaned. Accordingly, the height sensor 14 is used in confirming a cleaning area or a traveling path. As such a height sensor 14, a light emitting and receiving sensor can be used.

The obstacle sensor 15 is installed on a side of the robot cleaner 10, more preferably, on the front of the robot cleaner 10 on which the connecting terminals 11 are disposed. The obstacle sensor 15 is used in detecting an obstacle or wall located in a traveling direction or in front of the robot cleaner 10 and a distance from the obstacle or wall. As such an obstacle sensor 15, a light emitting and receiving sensor can be used.

Signals sensed by the sensors 14 and 15 as described above are transmitted to the control unit 19. The control unit 19 obtains information on a state, a position and the like of the robot cleaner 10 by comparing the transmitted signals with reference data stored in the memory 12, and controls the robot cleaner 10 by using the obtained information.

The dust collection-driving unit 16 provides a suction force for cleaning the surface 30 to be cleaned in the cleaning area. The dust collection-driving unit 16 can include a dust collecting motor.

The transmitting and receiving unit 17 is used in searching a charging position through a communication with a transmitting and receiving unit (not illustrated) installed in the charging station 20. In addition, the transmitting and receiving unit 17 functions to transmit and receive signals to and from a remote controller, which is operated by the user. Accordingly, the robot cleaner 10 can be remotely controlled.

The wheel driving unit 18, which selectively drives left and right driving wheels 10a installed on the bottom of the robot cleaner 10, is driven under a control of the control unit 19. The wheel driving unit 18 can be made up of stepping motors connected to the left and right driving wheels 10a, respectively. A reference numeral 10b of FIG. 2 represents a subsidiary wheel to which a driving force is not transmitted.

The charging station 20 is provided with a setting switch 21, which can selectively set up a value of threshold height through user's input, besides the charging terminals and the transmitting and receiving unit as described above. The setting switch 21 may be a dual inline package (DIP) switch. The user can set up various values of threshold heights (for example, 10 mm, 20 mm, 25 mm, 30 mm, etc.) by combining a plurality of operating tips formed on the DIP switch. Alternatively, to more minutely and easily set up the values of threshold heights, it is possible to employ a rotary switch, which changes a circuit connection through a rotation. Accordingly, if a value of threshold height has been stored as 20 mm in the memory 21 of the robot cleaner 10 in product delivery and a value of height of user's house thresholds is 25 mm, the user can freely set up a value of threshold height according thereto again by using the setting switch 21. Also, if the user moves into a new house in which thresholds have a different value of height, she or he can simply set up a value of threshold height according thereto again by using the setting switch 21. As a result, the robot cleaner 10 can travel around while smoothly crossing over a threshold 31.

Figure 3:
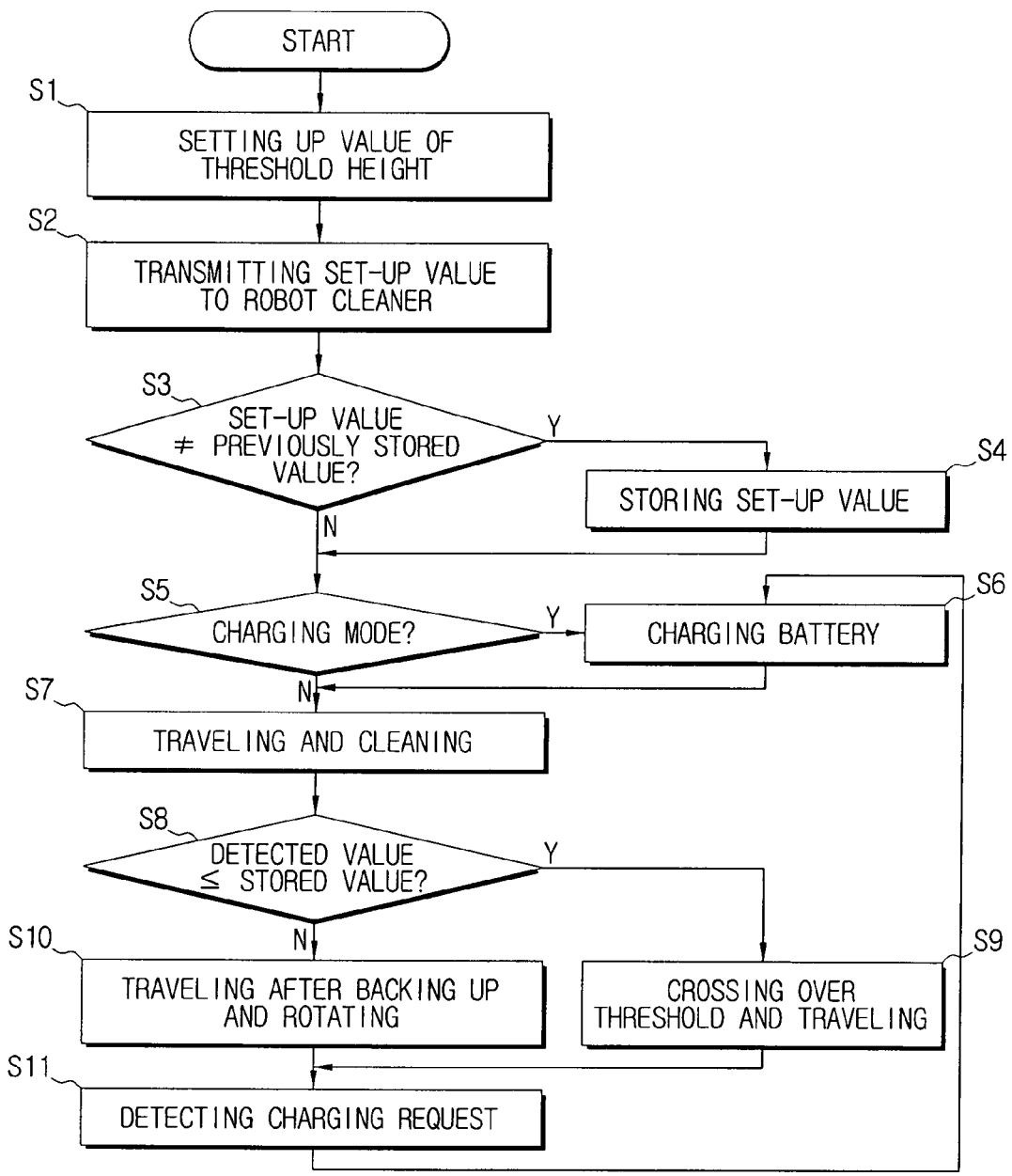
FIG. 3 is a flowchart exemplifying a control process in charging or traveling of the robot cleaner of the robot cleaner system according to the first exemplary embodiment of the present disclosure.

A control method of the robot cleaner system according to the first exemplary embodiment of the present disclosure constructed as described above is explained as follows with reference to FIG. 3. FIG. 3 is a flowchart exemplifying a control process in charging or traveling of the robot cleaner of the robot cleaner system according to the first exemplary embodiment of the present disclosure.

First, a user docks the robot cleaner 10 with the charging station 20, so that it is electrically connected with the charging station 20, and then sets up a value of threshold height by operating the setting switch 21 of the charging station 20 (S1). The value of threshold height set up as described above is transmitted to the memory 12 of the robot cleaner 10 (S2). Subsequently, the control unit 19 compares the set-up value of threshold height with the value of threshold height previously stored in the memory 12 of the robot cleaner 10 (S3). If the previously stored value of threshold height and the set-up value of threshold height do not coincide with each other, the control unit 19 deletes the previously stored value of threshold height from the memory 12 and then stores the set-up value of threshold height in the memory 12 (S4).

On the other hand, if the robot cleaner 10 is in a charging mode (S5), the robot cleaner 10 charges the charging battery 13 with electricity (S6). After the charge of the charging battery 13 is completed, the robot cleaner 10 is changed into a traveling mode, so that it departs from the charging station 20 and carries out a cleaning operation while traveling along the surface to be cleaned (S7). In traveling, if the robot cleaner 10 encounters a threshold 31, it continues to move until the front thereof is laid across the threshold 31. An then, the control unit 19 compares a height from the surface 30 to be cleaned continuously detected by the height sensor 14 with the value of threshold height stored in the memory 12 (S8), and controls the robot cleaner 10 to carry out different operations according to the compared result. Namely, if a distance h (see FIG. 2) between the height sensor 14 beyond the threshold 31 and the surface 30 to be cleaned detected by the height sensor 14 is the same as or less than the value of threshold height stored in the memory 12, the control unit 19 decides that the robot cleaner 10 crosses over the threshold 31, and controls the wheel driving unit 18 to drive forward, so that the robot cleaner 10 continues to move in a proceeding direction and thus completely crosses over the threshold 31 (S9). To the contrary, if the distance h exceeds the value of threshold height stored in the memory 12, the control unit 19 decides that the robot cleaner 10 is in a precipice, and controls the wheel driving unit 18 to drive rearward, so that the robot cleaner 10 moves in an opposite direction to the proceeding direction, and then controls the wheel driving unit 18, so that that the robot cleaner 10 travels after rotating in a certain angle (S10).

When the robot cleaner 10 carries out the cleaning operation while traveling along the surface to be cleaned, the control unit 19 measures an amount of electric charge, that is, a voltage of the charging battery 13 in a predetermined time period, and as the measured result, if a predetermined voltage, which the charging battery 13 should be charged, is detected, controls the robot cleaner 10 to return to the charging station 20 and to charge the charging battery 13 with electricity (S6).

Accordingly, the robot cleaner 10 can travel around while smoothly crossing over the threshold 31, and if encountering the precipice, change the traveling direction, so that it is prevented from falling off the precipice and being damaged.

Figure 4:
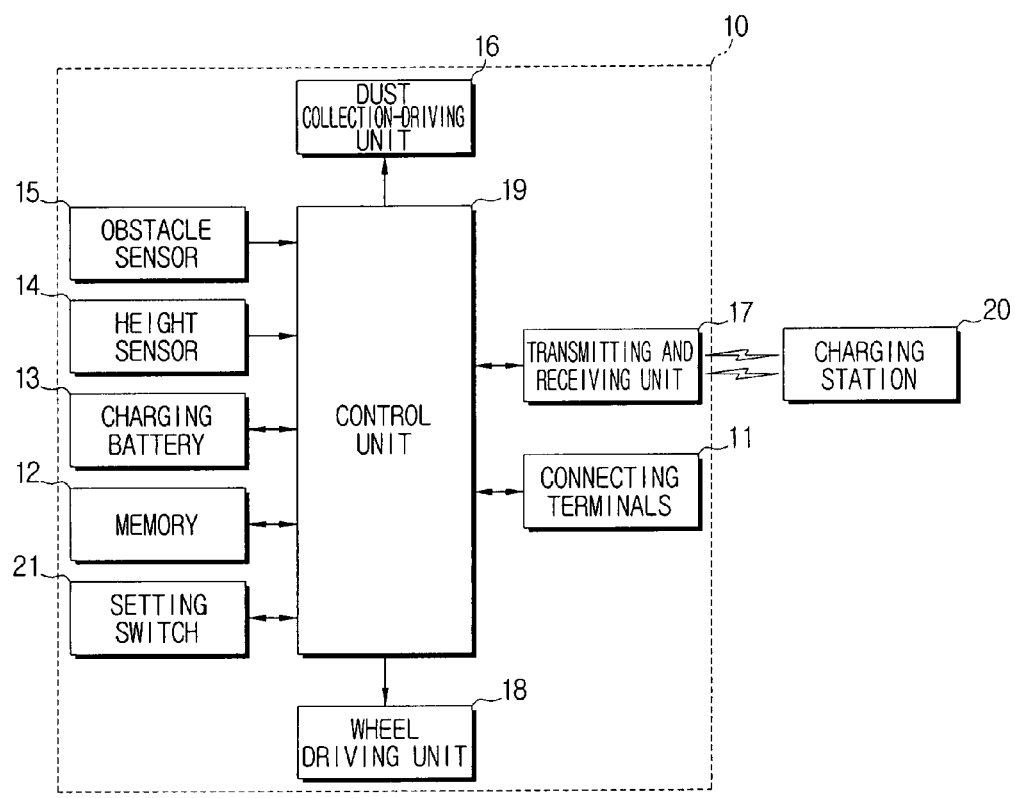
FIG. 4 is a schematic block diagram exemplifying a robot cleaner system according to a second exemplary embodiment of the present disclosure.

FIG. 4 is a schematic block diagram exemplifying a robot cleaner system according to a second exemplary embodiment of the present disclosure.

The robot cleaner system according to the first exemplary embodiment of the present disclosure is configured, so that the setting switch is installed on the charging station 20. However, the robot cleaner system according to the second exemplary embodiment of the present disclosure is configured, so that a setting switch 21 is installed on the robot cleaner 10, as illustrated in FIG. 4. Since constructions of the robot cleaner system of the second exemplary embodiment except the setting switch 21 are the same as those of the robot cleaner system of the first exemplary embodiment, detailed description thereof will be omitted for clarity and conciseness.

In the robot cleaner system of the second exemplary embodiment, as the setting switch 21 is directly installed on the robot cleaner 10, if a value of threshold height is set up through the setting switch 21, the set-up value of threshold height is directly stored in the memory 12 of the robot cleaner 12. In this case, if there is a previously stored value of threshold height in the memory 12, it is deleted and stored as substituted by the value of threshold height newly set up through the setting switch 21. At this time, a process of comparing the newly set-up value of threshold height with the previously stored value of threshold height can be omitted.

Figure 5:
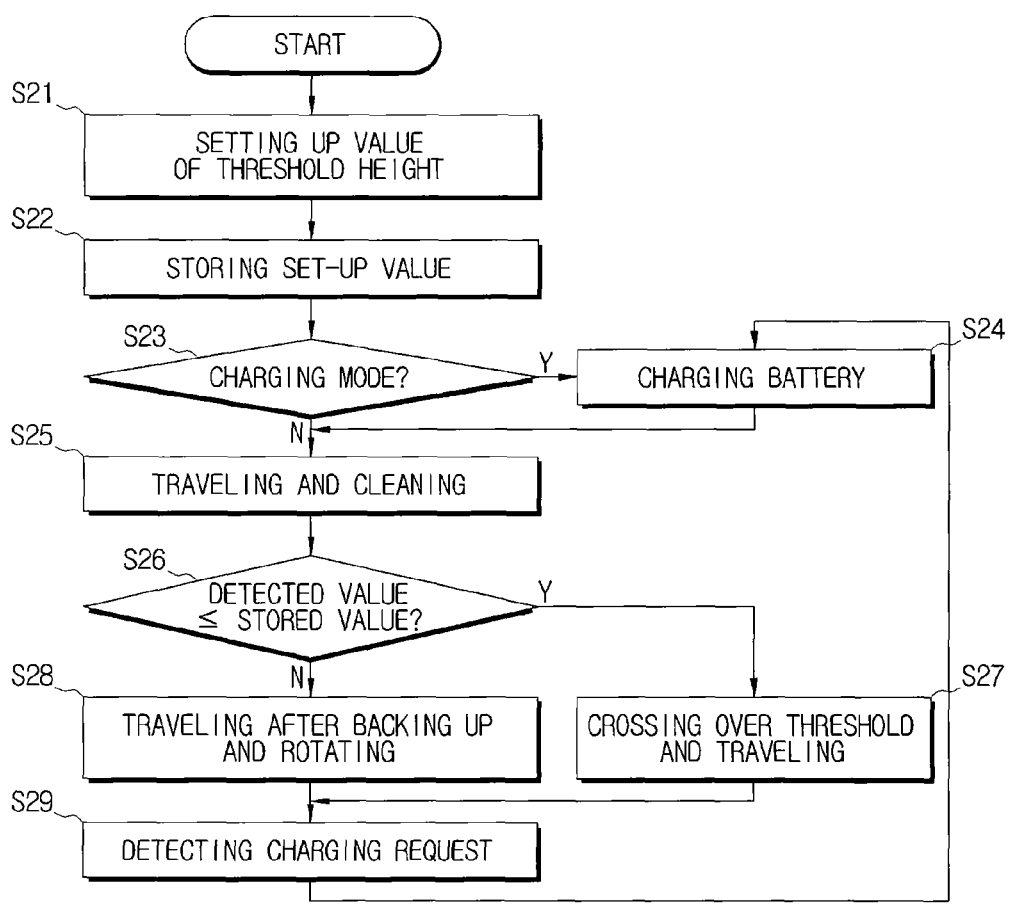
FIG. 5 is a flowchart exemplifying a control process in charging or traveling of the robot cleaner of the robot cleaner system according to the second exemplary embodiment of the present disclosure.

A control method of the robot cleaner system according to the second exemplary embodiment of the present disclosure constructed as described above is explained as follows with reference to FIG. 5. FIG. 5 is a flowchart exemplifying a control process in charging or traveling of the robot cleaner of the robot cleaner system according to the second exemplary embodiment of the present disclosure.

A user sets up a value of threshold height by operating the setting switch 21 (S21). The value of threshold height set up as described above is directly transmitted to the memory 12, and stored in the memory 12 after deleting a value of threshold height previously stored in the memory 12 (S22).

Operations S23~S29 from a step of deciding a charging mode to a step of detecting a charging request, that is, a predetermined voltage, which the charging battery 13 should be charged, are executed in the same manner as in the robot cleaner system according to the first exemplary embodiment of the present disclosure. Detailed descriptions on the operations will be omitted for clarity and conciseness.

Thus, unlike the robot cleaner system according to the first exemplary embodiment of the present disclosure in which the value of threshold height is set up at the charging station 20, the robot cleaner system according to the second exemplary embodiment of the present disclosure can set up the value of threshold height directly to the robot cleaner 10, thereby allowing the system to be easy to use and thus to improve an convenience thereof.

As apparent from the foregoing description, according to the exemplary embodiments of the present disclosure, the robot cleaner system and the control method thereof allow the user to easily set up the value of height to her or his house thresholds through the setting switch. Accordingly, the robot cleaner system and the control method thereof according to the exemplary embodiments of the present disclosure are advantageous in that even under environments having different threshold heights according to house structures of users, the robot cleaner can freely cross over the threshold to smoothly move between rooms.

Although representative embodiments of the present disclosure have been shown and described in order to exemplify the principle of the present disclosure, the present disclosure is not limited to the specific exemplary embodiments. It will be understood that various modifications and changes can be made by one skilled in the art without departing from the spirit and scope of the disclosure as defined by the appended claims. Therefore, it shall be considered that such modifications, changes and equivalents thereof are all included within the scope of the present disclosure.

What is claimed is:

1. A method of controlling a robot cleaner, comprising:
setting up a first value of threshold height;
storing the first value of threshold height in a memory of a robot cleaner;
comparing a second value of threshold height detected in traveling of the robot cleaner with the first value of threshold height; and
moving the robot cleaner in a direction corresponding to a compared result,
wherein the setting up step comprises setting the first value of threshold height through a setting switch installed on a charging station for charging the robot cleaner with electricity by a user before the robot cleaner is operated.

2. The method of claim 1, wherein the moving step, comprises:
traveling the robot cleaner to cross over a threshold when the second value of threshold height is the same as and less than the first value of threshold height;
backing up and rotating the robot cleaner when the second value of threshold height exceeds the first value of threshold height; and
traveling the robot cleaner.

3. The method of claim 1, wherein the storing step, comprises:
transmitting the first value of threshold height;
comparing the first value of threshold height with a third value of threshold height previously stored in the memory of the robot cleaner;
substituting the third value of threshold height by the first value of threshold height; and
storing the first value of threshold height when the first value of threshold height and the third value of threshold height do not coincide with each other.

4. A method of controlling a robot cleaner, comprising:
setting up a first value of threshold height;
storing the first value of threshold height in a memory of a robot cleaner;
comparing a second value of threshold height detected in traveling of the robot cleaner with the first value of threshold height; and
moving the robot cleaner in a direction corresponding to a compared result, wherein the setting-up step comprises setting up a first value of threshold height through a setting switch installed on the robot cleaner by a user before the robot cleaner is operated.

5. A robot cleaner system, comprising:
a robot cleaner to carry out a cleaning operation while automatically traveling along a surface to be cleaned; and
a charging station connectable with the robot cleaner to charge a charging battery mounted in the robot cleaner with electricity;
wherein the charging station comprises a setting switch for selectively setting up a first value of threshold height by a user before the robot cleaner is operated;
wherein the robot cleaner comprises a control unit for receiving the first value of threshold height, the control unit for storing the first value of threshold height in a memory, the control unit for comparing a second value of threshold height detected by a height sensor of the robot cleaner in traveling with the first value of threshold height, the control unit for controlling the robot cleaner to travel while crossing over a threshold when the second value of threshold height is the same as and less than the first value of threshold height, the control unit for controlling the robot cleaner to travel after backing up and rotating when the second value of threshold height exceeds the first value of threshold height.

6. The robot cleaner system of claim 5, wherein the setting switch comprises one of a dual inline package (DIP) switch and a rotary switch.

7. A robot cleaner system, comprising:
a robot cleaner to carry out a cleaning operation while automatically traveling along a surface to be cleaned; and
a charging station connectable to the robot cleaner, the charging station for charging a charging battery mounted in the robot cleaner with electricity;
wherein the robot cleaner comprises a setting switch for selectively setting a first value of threshold height by a user before the robot cleaner is operated;
wherein the robot cleaner comprises a control unit to store the first value of threshold height set up, the control unit for comparing a second value of threshold height detected by a height sensor of the robot cleaner in traveling with the first value of threshold height, the control unit for controlling the robot cleaner to travel while crossing over a threshold when the second value of threshold height is the same as and less than the first value of threshold height, the control unit for controlling the robot cleaner to travel after backing up and rotating when the second value of threshold height exceeds the first value of threshold height.

8. The robot cleaner system of claim 7, wherein the setting switch comprises one of a dual inline package (DIP) switch and a rotary switch.

* * * * *